June 18, 1935. R. R. SUCKY ET AL 2,005,483
GEAR SHIFT LEVER SWITCH
Filed Aug. 3, 1934    2 Sheets-Sheet 1
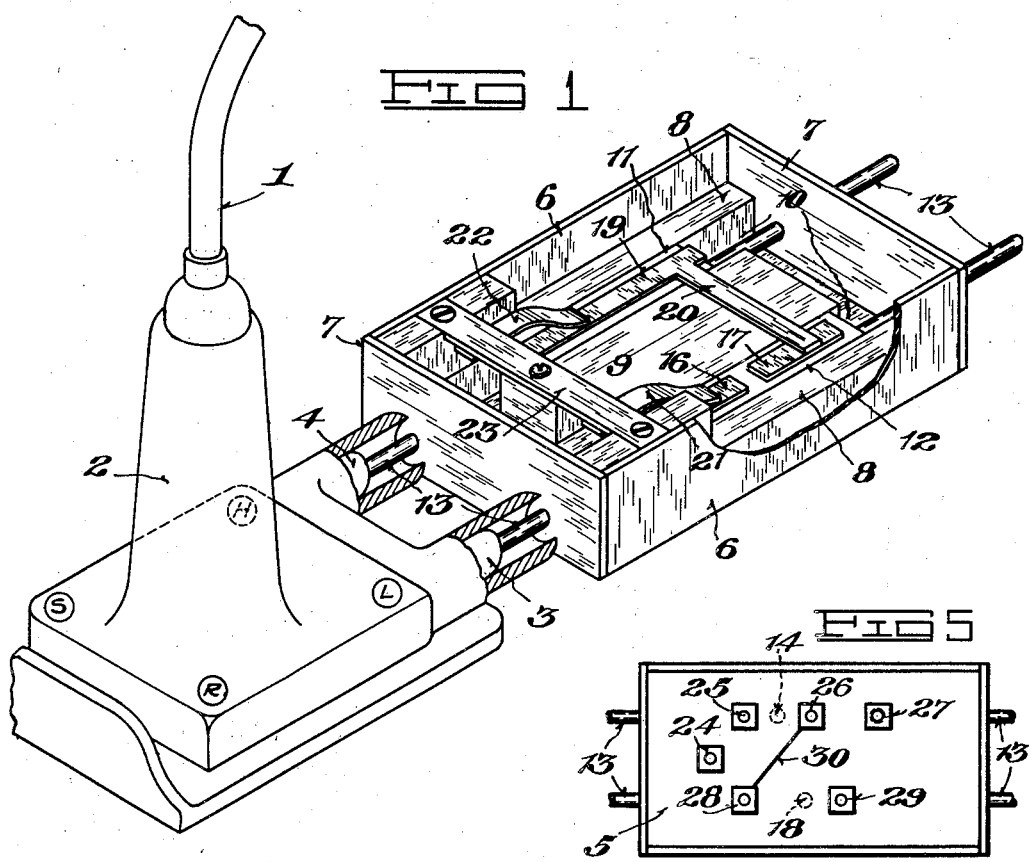
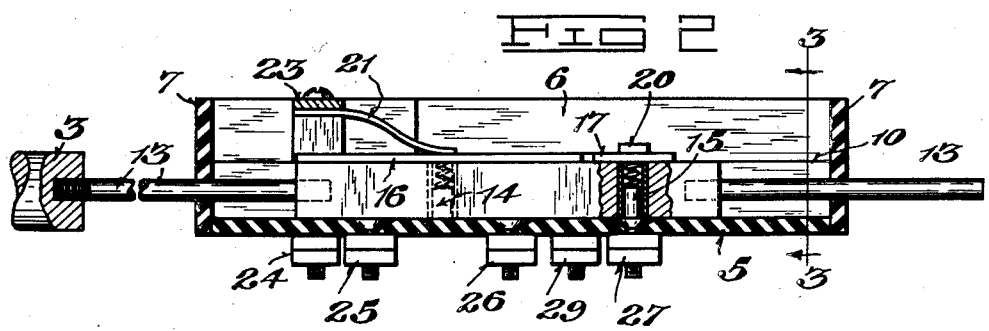
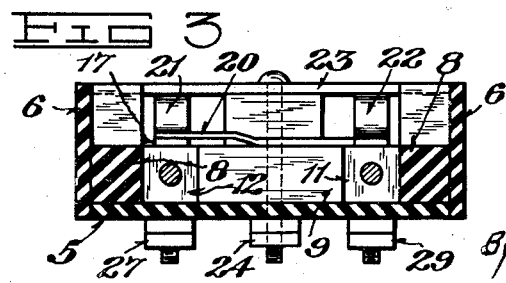
INVENTORS
Rudolph R. Sucky
Edward F. McDonigal
Edgar Bargar
By Martin T. Manion
ATTORNEY

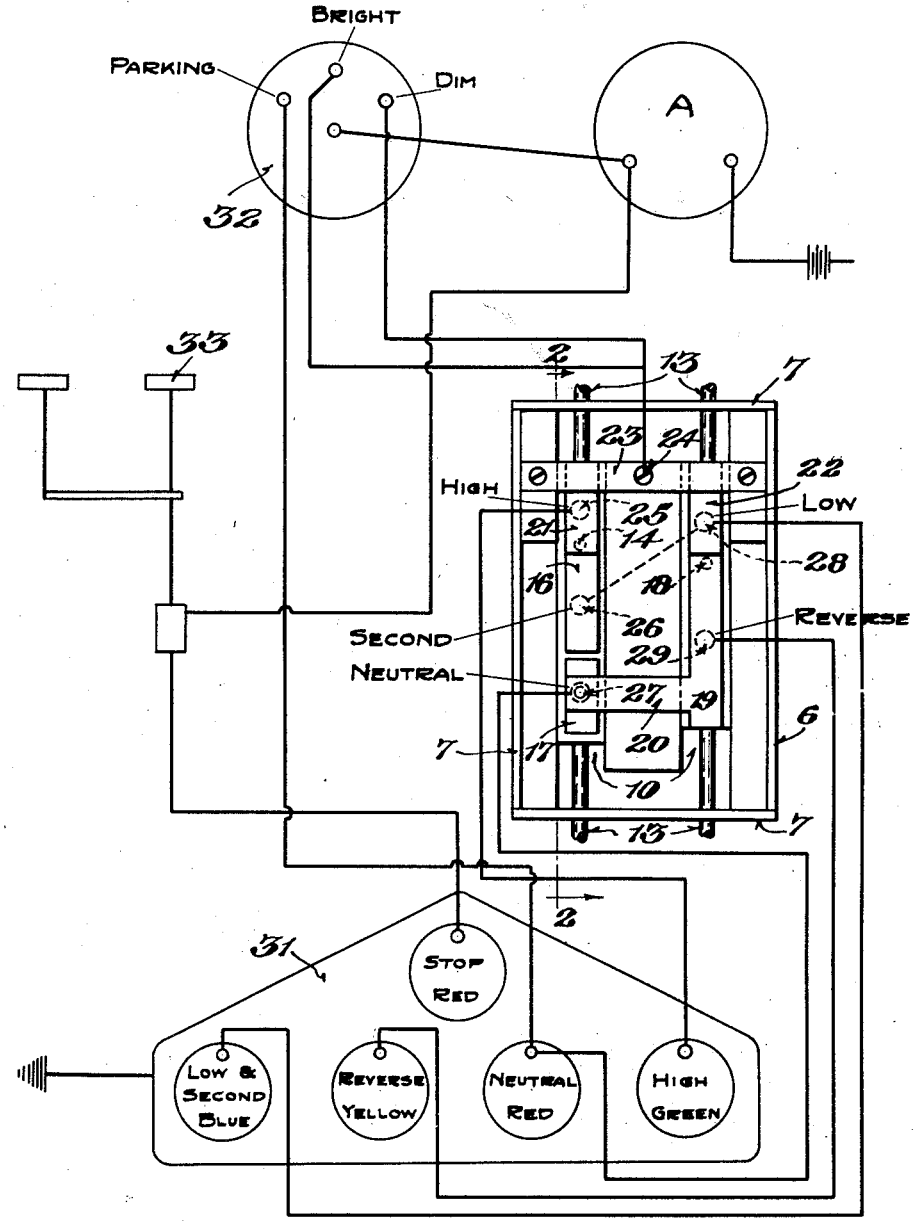

Patented June 18, 1935

2,005,483

UNITED STATES PATENT OFFICE 2,005,483

GEAR SHIFT LEVER SWITCH

Rudolph R. Sucky, Edward F. McGonigal, and Edgar Bargar, Blaine, Ohio

Application August 3, 1934, Serial No. 738,248

2 Claims. (Cl. 200—59)

This invention relates broadly to signalling systems for automobiles, and more specifically to a switch mechanism associated with the gear shifting mechanism of the automobile for operating such systems.

The primary object of the invention is to provide a simple and efficient switch mechanism for operating an electrical signalling system, preferably located on the rear of an automobile, whereby a motorist approaching from the rear may be informed whether the automobile is moving or at a standstill, and, if moving, whether in a forward or backward direction, and the approximate speed of forward travel, the signal being transmitted by the illumination of selective colored lights.

With these and other objects in view, reference is herein had to the accompanying drawings, in which Figure 1 is a perspective view of the operating switch showing the same attached to one form of gear shifting lever construction;

Figure 2 is a sectional view taken on line 2—2, Fig. 4;

Figure 3 is a cross sectional view taken on line 3—3, Fig. 2;

Figure 4 is a diagrammatic view illustrating the associated electrical wiring connections; and Figure 5 is a bottom view of the switch somewhat reduced.

Referring to said drawings, the reference numeral 1 designates one form of gear shift lever used on automobiles, the lower end of which is enclosed within a metal housing 2. Parallel shifting rods 3 and 4 which carry the shifting forks (not shown) are located at opposite sides of the housing and are adapted to slide forwardly and rearwardly during the operation of gear shifting, the rod 3 being moved forwardly a limited distance when in high gear and being moved rearwardly when in second gear. Likewise, the shifting rod 4 is moved forwardly when in low gear and is moved rearwardly when in reverse gear.

The operating switch is housed within a rectangular casing comprising a bottom 5, side walls 6 and end walls 7, preferably made of an appropriate insulating material. In use, the casing may also be provided with a suitable top closure so as to completely encase the hereinafter described elements from dust, grease and other objectionable matter.

Permanently fitted within the angle between the bottom 5 and each of the side walls 6 of the casing are rectangularly shaped insulated members 8, while a larger block of insulation material 9 is permanently positioned in the center of the casing, the members 8 and 9 being so spaced from each other to provide a pair of spaced parallel grooves 10. While the members 8 and 9 are herein shown and described as being separate elements, it will be understood that they may readily be formed integrally with the casing.

Adapted for longitudinal sliding movements in said grooves 10 are two contact carrying elements 11 and 12. Each of said elements 11 and 12 is composed of a rectangularly shaped bar of insulation material having rods 13 protruding outward from each of the opposite ends thereof and extending outwardly of the casing through openings provided therefor in the end walls 7, one end of each of said rods being externally screw threaded to be received by internal threads provided in the shifting rods 3 and 4, as shown in Fig. 2. In this manner, the switch is connected to the gear shifting mechanism to be operated by the latter.

The sliding element 12 has therein two spaced vertical bores lined with a copper bushing in which spring pressed carbon contacts 14 and 15 are retained, the lower ends of said carbon contacts contacting the bottom 5 of the casing on the upper surface thereof. A length of copper 16, or a strip of other appropriate current conducting material, is fastened to the upper surface of the element 12 overlying and communicating with the contact 14, while a shorter length of current conducting material 17, as copper, spaced a distance away from the strip 16, overlies and communicates with the carbon contact 15.

Likewise, the slidable element 11 is vertically bored and lined with a bushing intermediate its opposite ends to house a similar spring pressed carbon contact 18, a flat strip of current conducting material 19, as copper, being fastened to the upper face of the element 11 and communicating with the carbon contact 18, said strip 19 being substantially L-shaped having a transverse arm portion 20 terminating in an overlying contacting position with the strip 17 of the element 12.

Downturned springs 21 and 22 have their free ends overlying and frictionally engaging the flat metal strips 16 and 19, respectively, the opposite ends of the springs being permanently attached to and supported by a metal cross bar 23 extending transversely of the switch casing adjacent one end thereof.

A plurality of terminals 24, 25, 26, 27, 28 and 29 are provided on the under side of the bottom of the casing to which are attached electrical conductors, as will hereinafter be fully explained. As will be understood following a study of the drawings, the terminals 25, 26 and 27 are in horizontally aligned and spaced relation beneath the sliding element 12, said terminals at their upper ends having countersunk heads positioned interiorly of the casing and which serve as contact points. The terminals 28 and 29 occupy horizontally aligned and spaced relation beneath the sliding element 11, these last mentioned terminals also having countersunk heads at their upper ends to function in the capacity of contact points. The terminal 24 has an elongated vertically extending shank whose upper end connects to the metal cross bar 23.

As shown in Fig. 4 of the drawings, each of the terminals 25, 26, 27, 28 and 29 are connected by electrical conductors in a predetermined electrical circuit to a specific signalling device, as an electric lamp, mounted on the rear of the vehicle. For instance, the terminal 25 is connected to a green colored signal lamp; the terminal 26 is connected to a blue signal; the terminal 27 is connected to a red signal; the terminal 28 is connected to the same blue signal as the terminal 26 by reason of being in the same circuit, the terminals 28 and 26 being in a common circuit by the provision of the connector 30, and the terminal 29 is connected to a yellow signal. The colored signals may consist either of colored electric lamps or they may be clear lamps designed to have the light therefrom refracted through colored lenses. In any event, the various signals are carried within an ornamental casing 31, which latter is suitably grounded.

As shown in the drawings, the gear shift lever is positioned in the neutral position. In such position, the sliding contact carrying elements occupy what might be termed normal position whereby the carbon contact 15 registers with the terminal 27. Assuming that an electric current is supplied to the terminal 24, as illustrated in Fig. 4, the current flows through the cross bar 23, spring 22, metal strip 19 and transverse arm 20 to the separated metal strip 17 of the sliding element 12, from whence the current flows through the carbon contact 15 and terminal 27 to the red signal for serving as an ordinary tail-light to denote that the car is at a standstill, the red signal being the sole visible signal.

When, however, the gear shift lever is moved to low gear position, as when forward travel is commenced, forward movement of the shifting rod 4 causes a like forward movement of the sliding element 11 to so position its carbon contact 18 in register with the terminal 28 leading to and thereby illuminating the blue signal. Such movement of the sliding element 11 it will be noted moves the transverse arm 20 out of contacting relation with the strip 17, breaking that particular circuit so that as a consequence the red light ceases to be illuminated and the blue light alone is illuminated to denote that the automobile is traveling forward in low gear.

Upon shifting to second gear, the sliding element 11 is returned to its normal position and the element 12 is moved rearwardly with the rearward movement of the shifting rod 3 to a position where the carbon contact 14 registers with the terminal 26. In such position, the blue signal continues to be illuminated, the electrical current in this instance flowing from the cross bar 23 to the metal strip 16 through the spring conductor 21. It will be noted that in the second gear position, the carbon contact 15 is brought out of register with the terminal 27 so that the red signal continues to be invisible.

In shifting to high gear, the sliding element is moved to its forward limit wherein the carbon contact 14 registers with the terminal 25 for illuminating the green signal. Again the red signal remains invisible because the carbon contact is in non-registering relation to the terminal 27.

When the gear shift lever is moved to reverse position, the sliding element 12 is maintained in its normal position and the element 11 is moved rearwardly to position the carbon contact 18 of said element in register with the terminal 29, in which position the yellow signal is illuminated. In this latter described position, the arm 20 is out of contact with the metal strip 17 so that current is not supplied thereto and the red signal is not illuminated.

From the above description, it will be readily understood that but one signal is rendered visible at any one time, the signal system being controlled automatically by the positioning of the gear shift lever. Particular attention is called to the fact that the red neutral signal can only receive current through the switch mechanism described by means of the arm 20 and isolated strip 17. Only in neutral position can these two elements be found in contacting current conducting relation.

The switch mechanism described is operative only simultaneously with the illumination of the headlights of the automobile so that the signalling system is rendered inoperative during the daytime. This is rendered possible by connecting the switch mechanism heretofore described in the dim and bright circuits of the switch 32 used for controlling the headlights. The switch and signalling system, however, are not included in the electrical circuit used when so called parking lights are illuminated, except that the red (neutral) light alone is in this latter circuit to be utilized in this instance as a rear warning or tail-light. The system is rendered inoperative when parking lights are illuminated for the reason that in some instances it is advisable to permit the automobile to remain in gear, as when parked on an inclined highway.

The ordinary stop light to be illuminated upon depression of the foot brake pedal 33 of the automobile is accorded a conspicuous space in the casing 31.

While we have herein shown and described one means of connecting the switch to the shifting forks, it will be understood that we do not limit ourselves to this specific manner of attachment and location inasmuch as it is contemplated to otherwise accomplish connection due to varying types and constructions of gear shifting apparatus being used on various makes of automobiles.

What is claimed is—

1. A gear shift lever switch for use with automobile signal systems, including a casing having spaced upwardly facing parallel grooves in the bottom wall thereof, a plurality of spaced contacts in each of said grooves, a slidable switch element in one of said grooves having a pair of spaced contacts adapted for engagement with the contacts of said groove, a second slidable switch element in the other of said grooves having a single contact adapted to engage the contacts of said groove, a conducting element connected to the last named single contact and having a part thereof engaging one of the contacts carried by the other of said slidable switch elements, a pair of spaced contacts carried by the casing above the switch elements one of which is adapted to engage the conducting element of the first mentioned slidable switch element while the other is engaged with one of the pair of contacts carried by the first named switch element, and means connecting the gear shift lever with said slidable switch elements whereby to selectively engage each of the latter with their associated spaced contact elements when the shift lever is moved to varying positions.

2. A gear shift lever switch for use with automobile signal systems, including a casing having spaced upwardly facing parallel grooves in the bottom wall thereof, a plurality of spaced contacts in each of said grooves, a slidable switch element in one of said grooves having a pair of spaced contacts adapted for engagement with the contacts in said groove, a second slidable switch element in the other of said grooves having a single contact adapted to engage the contacts in said groove, a conducting element connected to the last named single contact and having a part thereof engaging one of the contacts carried by the other of said slidable switch elements, a pair of spaced contacts carried by the casing above the switch elements, one of which is adapted to engage the conducting element while the other is engaged with one of the pair of contacts carried by the first named switch element, and means connecting the gear shift lever with said slidable switch elements including a pair of rods, each having an end adapted for connection to a shifting rod of the gear shifting mechanism and each having an end connected to one of the switch elements whereby to selectively engage each of the latter with their associated spaced contact elements when the shift lever is moved to varying positions.

RUDOLPH R. SUCKY.
EDWARD F. McGONIGAL.
EDGAR BARGAR.